US005135063A

United States Patent [19]

Kropf

[11] Patent Number: 5,135,063

[45] Date of Patent: Aug. 4, 1992

[54] POWER UNIT FOR DRIVING MANUALLY-OPERATED WHEELCHAIR

[75] Inventor: Walter K. Kropf, Harrisburg, Oreg.

[73] Assignee: Smucker Manufacturing, Inc., Harrisburg, Oreg.

[21] Appl. No.: 575,344

[22] Filed: Aug. 30, 1990

[51] Int. Cl.[5] .......... B60K 1/02

[52] U.S. Cl. .......... 180/13; 180/907; 280/304.1

[58] Field of Search .......... 180/907, 13, 65.2, 15; 280/250.1, 304.1, DIG. 2, DIG. 6, DIG. 10

[56] References Cited

U.S. PATENT DOCUMENTS

| | | | |
|---|---|---|---|
| 2,448,992 | 9/1948 | Love et al. | 180/907 |
| 2,495,573 | 1/1950 | Duke | 180/15 |
| 2,978,053 | 4/1961 | Schmidt | 180/26 |
| 2,993,550 | 7/1961 | Klappert | 180/15 |
| 3,100,547 | 8/1963 | Rosenthal | 180/6.5 |
| 3,688,857 | 9/1972 | Miller | 190/6.5 |
| 3,770,073 | 11/1973 | Meyer | 180/65 R |
| 3,893,529 | 7/1975 | Karchak, Jr. et al. | 180/6.5 |
| 3,896,891 | 7/1975 | Miltenburg et al. | 180/6.5 |
| 3,905,437 | 9/1975 | Kaiho et al. | 180/907 |
| 4,386,672 | 6/1983 | Coker | 180/13 |
| 4,512,613 | 4/1985 | Nassiri | 180/907 |
| 4,750,578 | 6/1988 | Brandenfels | 180/13 |
| 4,759,418 | 7/1988 | Goldenfeld et al. | 180/65.1 |
| 4,773,495 | 9/1988 | Haubenwallner | 280/250.1 |

*Primary Examiner*—Charles A. Marmor
*Assistant Examiner*—Anne Marie Boehler
*Attorney, Agent, or Firm*—Marger, Johnson, McCollom & Stolowitz

[57] ABSTRACT

This invention relates to a power drive unit which is attachable to, and detachable from, a conventional wheelchair. Thus, a conventional manually-powered wheelchair can be converted into a power driven wheelchair employing the subject apparatus for driving and directing the movement of a manually-driven wheelchair having a plurality of wheels riding on an underlying surface. The subject apparatus comprises a drive and steering wheel which rides on the underlying surface for driving and for directing the path of operation of the wheelchair, as well as for powering the drive wheel. The apparatus is attachable to, and detachable from the wheelchair and is located rearwardly of the wheelchair so that the weight on the drive and steering wheel will substantially only be the weight of the apparatus. On the other hand, the weight of a person sitting in the wheelchair will be substantially the only weight imparted to the wheelchair wheels. The power steering and driving operations are continuously conducted using the drive wheels, without regard to substantial direct downward forces imparted to the drive wheels by the wheelchair user. The unit preferably comprises a single rear-wheel drive motor and wheel unit.

9 Claims, 3 Drawing Sheets

POWER UNIT FOR DRIVING MANUALLY-OPERATED WHEELCHAIR

BACKGROUND OF THE INVENTION

The present invention relates to power units used to drive manually-operated conventional wheelchairs, and more particularly, to novel power units which are attachable to and detachable from conventional wheelchairs for producing power-driven wheelchairs.

Conventional manual-powered wheelchairs of varying configuration are well-known in the prior art. Furthermore, power-driven wheelchairs, particularly electrical power driven wheelchairs, are also known in the prior art. Unfortunately, many people who require the use of a powered wheelchair are not able to afford one because they are too expensive for them to purchase. Therefore, an aftermarket has developed for detachable electrical drive power units for conventional non-powered wheelchairs. But even these latter detachable power units are in the several thousand dollar price range and have significant design limitations.

Various types of these detachable drive units are known in the prior art. For example, U.S. Pat. No. 4,386,672 comprises such a unit mounted under the front of the wheelchair with the steering column extending upward from the front center of the wheelchair between the legs of the wheelchair occupant. This handle is supported to a swivel by means of a lower cooperating joint so that a person can get in and out. First of all, it is impractical for a disabled person to try to get in and out of a wheelchair having an obstruction in the front of same. This is the case even here where the handle swings out of the way since one can still stumble over it. Once seated in the chair, it becomes difficult for the user to reach the handle in its retracted position. Additionally, there is no way of preventing the handle from falling over when the user wants to move the handle out of the way or to a retracted position. If the handle were secured at a higher level, to expedite use by a person sitting in the wheelchair, this would interfere with the entry and exit from the wheelchair by the user. Finally, the handle U-joint arrangement provides for difficulty in handling of the steering for a person sitting in the chair because of the amount of strength required to maneuver the chair with this type of direct-drive configuration.

U.S. Pat. No. 2,495,573 comprises a motor attachment for wheelchairs which is large, bulky, not easily attached to or removed from a conventional wheelchair, and difficult to transport in a vehicle. The steering is located at the front of the wheelchair and includes casters. If the steering wheels are lifted up off the ground, steering is eliminated. The rear wheels, which are belt driven, are not directly driven but instead follow the turning operations of the device.

U.S. Pat. No. 4,759,418 describes an electrical drive attachment for a wheelchair. The drive is not reversible because of the contact angle between the drive device and the ground as hereinafter described. This provides for poor steering. Because of its location behind the rear axle it will resist efforts to turn. Since the angle of contact of the wheels with respect to the ground is about 70% in order to maintain good traction, any surface irregularities will be magnified many times, resulting in an erratic drive pattern. Furthermore, since the drive wheel is not in alignment with the rear wheels, a user of the wheelchair must skid one side or the other to turn the unit.

U.S. Pat. No. 2,993,550 comprises a multi-wheel, multi-motor unit. This unit is difficult to assemble, disassemble, and transport by vehicle. The steering mechanism turns the front wheels so that the problems described above with respect to U.S. Pat. No. 4,386,672 are applicable herein.

U.S. Pat. No. 3,688,857 and U.S. Pat. No. 3,100,547 each have two motors and include drive belt assemblies attached to a battery and stand, making it quite bulky and difficult to use for transport. This unit provides variable speed steering by the counteracting effect of two motors used in tandem. This type of maneuvering of the chair is particularly difficult for handicapped persons who are trying to drive the wheelchair. In the case of U.S. Pat. No. 3,100,547, the unit includes a battery trailer with one caster wheel.

U.S. Pat. No. 2,978,053 is a driving and steering apparatus for wheelchairs. It includes a cart for the wheelchair and is tilted back in use which creates a very unstable condition for the driver. It also includes multi-wheels and multi-motors. The unit has front wheel drive and steering. Suffice it to say, this unit is heavy, bulky, and difficult to assemble, disassemble, and store in vehicular use for trips.

Examples of motorized invalid vehicles which are not adapted for use in conjunction with conventional wheelchairs, but are instead manufactured for direct power-driven use, are set forth in U.S. Pat. No. 3,896,891 ("Modular Motorized Wheelchair"), U.S. Pat. No. 3,770,073 ("Foldable Invalid Chair"), and U.S. Pat. No. 4,750,578 ("Dismantleable and Collapsible Utility Cart").

Therefore, a need exists for a motorized unit for driving a conventional wheelchair which overcomes the problems described above with respect to the prior art devices.

SUMMARY OF THE INVENTION

This invention comprises a power drive unit which is attachable to, and detachable from, a conventional wheelchair, and which overcomes all of the problems discussed above regarding the prior art power drive systems. The drive unit of the present invention does not include any obstructions which can block a person trying to be seated within the confines of the wheelchair. This is critical for elderly or disabled persons with limited leg functions.

The portability of electrically powered collapsible wheelchairs have been improved by this invention, and the size and complexity of detachable drive units has been improved. For example, the entire wheelchair and power drive system can be disassembled to form a small size package transport unit wherein the subject motor drive unit itself can weigh as little as about 14 pounds and have maximum structural dimensions of about $16'' \times 16'' \times 14''$ in size. The entire unit can be set up and broken down in about a minute or less. It can also be componentized for fast, safe, and easy breakdown and transport, even in small compact cars. Many of the components, for example, such as the steering mechanism, control lever, switches, wiring harness and brackets, stay on the chair and fold into the car with the chair itself. Therefore, there is no additional breadth than the dimensions of the chair itself. The added weight of those parts can be less than about 3 pounds. The componentized units are available for safer, easier lifting and storage. The battery box and drive unit break quickly into two removable components.

Thus, a conventional manually-powered wheelchair can be converted into a power driven wheelchair employing the subject apparatus for driving and directing the movement of a manually-driven wheelchair having a plurality of wheels riding on an underlying surface. The subject apparatus comprises drive and steering wheel means which ride on the underlying surface for driving and for directing the path of operation of the wheelchair, as well as means for powering the drive wheel means. The apparatus is attachable to, and detachable from the wheelchair and is located rearwardly of the wheelchair so that the weight on the drive and steering wheel means will substantially only be the weight of the apparatus. On the other hand, the weight of a person sitting in the wheelchair will be substantially the only weight imparted to the wheelchair wheels. The power steering and driving operations are continuously conducted using the drive wheels, without regard to substantial direct downward forces imparted to the drive wheels by the wheelchair user. The unit preferably comprises a single rear-wheel drive motor and wheel unit.

More specifically, the weight of the power source (battery) and drive motor weight are centered on the rear drive wheel, placing all of this weight on the drive wheel so that the unit does not freewheel by lifting off the ground. This is a problem in certain units such as U.S. Pat. No. 4,759,418. Thus, traction is provided exclusively by the weight of the battery, motor and traction frame. Therefore, there is a constant vertical traction force for driving and steering the unit. Moreover, there is substantially no net weight effect on the chair which contributes to maximum stability without adversely affecting the chair manufacturers provision for stability. In other words, the weight of the person is on the chair's wheels only, so any changes in the persons weight or the size or type of chair does not affect the imparted weight to the drive wheel or the traction of the unit.

One advantage of the invention is that the drive wheel remains in continuous contact with the ground over uneven surfaces while maintaining an even contact pressure with the ground. Front caster wheels on existing chairs are not used for steering but are merely allowed to pivot freely, as they were designed, to reduce the hazard of the casters catching or turning under, or the chair overturning. It allows higher speed rates, particularly safer in gravelled areas or on bumps. The unit flexes up and down over surface irregularities to provide continuous contact and drive qualities because of weight over the rear drive wheels. A pivoting rear drive carriage with battery weight disposed thereon maintains uniform drive friction independent of bumps and irregular slopes.

The apparatus includes means for a user seated in the wheelchair to conduct steering and driving operations with a drive wheel. The apparatus of this invention also allows the wheelchair to be driven in forward and reverse directions. This is contrary to a number of the drive mechanisms of the prior art, for example, U.S. Pat. No. 2,495,573.

The system preferably comprises a direct drive linkage rear wheel steering which will variably maneuver a turn angle corresponding to the angle of the lever. Therefore, to the user, the direct drive feature is that the movement of the turning lever directly corresponds to the movement of the chair. It is also steerable with either hand. The direct drive linkage rear wheel system is therefore designed so that the steering wheel will turn at an angle corresponding to the angle of the means for controlling the drive wheel means.

Another preferred feature of this invention is that it is designed to operate at a fixed, predetermined independent speed. This is particularly safer for someone who has minimum motor skills and/or limited hand movement and coordination. This means for controlling the speed of the drive wheel means includes variable speed control means which can be independently set and controlled at a predetermined constant driving speed. Preferably, the means for controlling the drive wheel means comprises a rheostat or other like device. In this way, the person steering the unit can do so at that set rate of speed. The speed range is independently fixed from low settings where more precise steering operations are required, such as inside close quarters, to high settings for less precise steering and cornering, such as for outside use.

A drive wheel is provided which is disengageably mounted to a worm gear alongside the drive lever which rotates on a gear motor output shaft. This disengageable drive lever puts the drive wheel in neutral and allows the chair to be used manually when desired or in the event of battery failure. The unit has a neutral-easy hand power override of the power unit which is operable by the wheelchair user without detachment of the drive unit or lifting of the rear gear off the ground as required in U.S. Pat. No. 4,750,578.

In another preferred embodiment, the means for controlling the direction of rotation the drive wheel means preferably comprises a lever which is movable to respective forward, stop, and reverse positions. The area traversed by the lever in the stop position is substantially greater than the respective areas for the forward and reverse positions. Therefore, a wheelchair driver with poor muscle control will not experience difficulty of maneuverability by accidentally engaging the incorrect directional position when attempting to stop. Additional features of this device include the additional fifth wheel in the rear, eliminating problems of torquing reaction, and there is added stability in the unit because the battery preferably abuts the wheelchair on a sloped surface.

The pivoting motorized drive wheel is attached to a platform that also pivots. However, the platform pivots about a horizontal axis defined by its two connection points to a frame beneath the wheelchair. The connection points of the platform to the frame are fabricated to allow the platform to easily detach for quick removal. The motor is powered by a large battery that is secured to the platform. This configuration, directs the weight of the battery to the drive wheel thereby creating sufficient traction against the ground.

The user controls the direction of the wheelchair by controlling the direction of the drive wheel. To control the direction of the drive wheel, a mechanical linkage extends from the drive wheel to the hand of the user. In addition, the user controls the speed of the wheelchair by controlling the speed of the motor. A control knob located near the user's hand provides such control. Moreover, a joystick connected to a control so provided can be used to control both forward and reverse and the steering direction of the wheelchair. As described in the foregoing, the present invention can be employed to drive either a standard non-folding or a collapsible type wheelchair. The means for controlling the drive wheel means also can include means for disengaging the drive wheel means from means for powering the drive wheel means. By the use of this mechanism, the drive wheel can be disengaged from the drive shaft allowing the wheelchair to be operated manually.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 1:
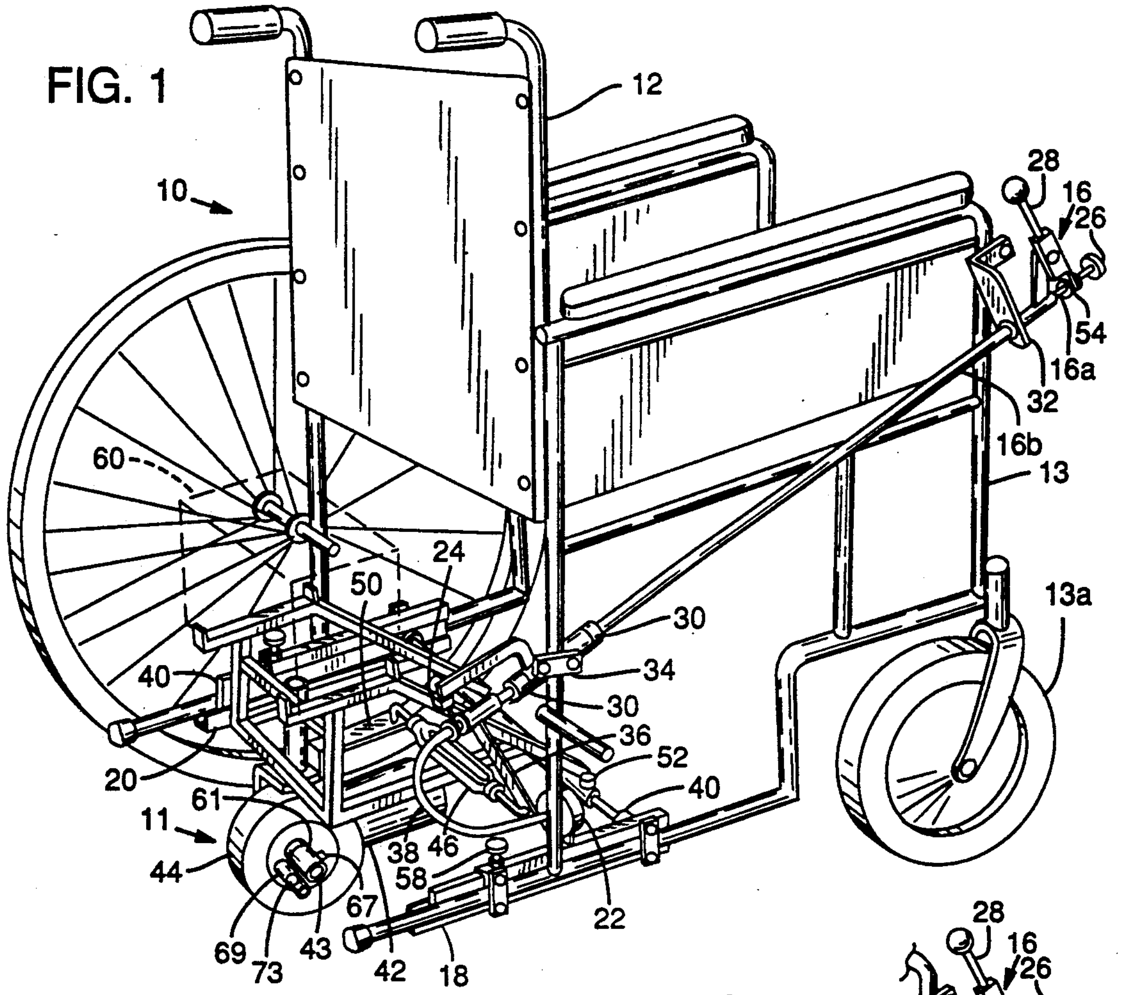
FIG. 1 is a perspective view of a manually driven wheel chair fitted with a power unit according to the present invention.
Figure 5:
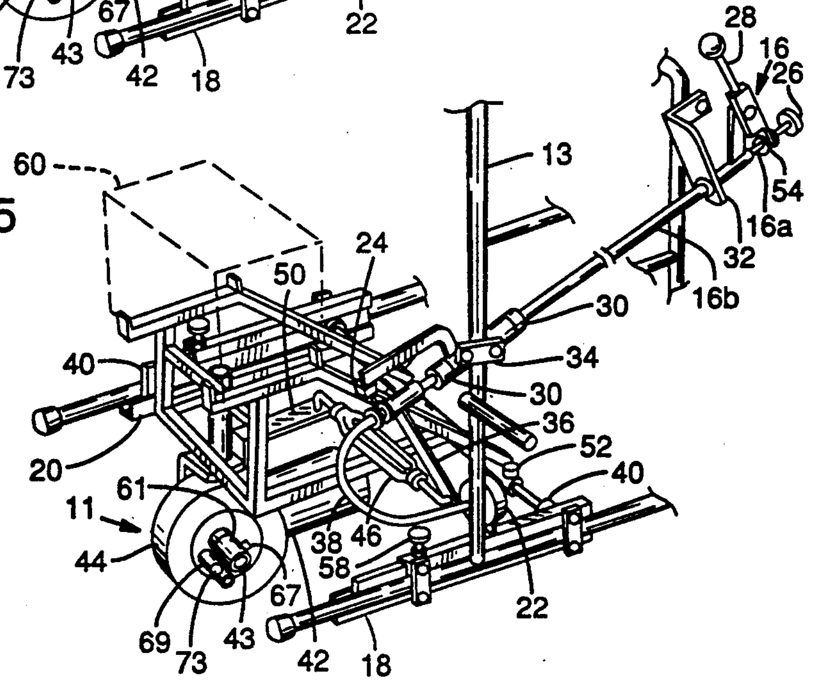
FIG. 5 is a perspective view of the power unit shown in FIG. 1.
Figure 2:
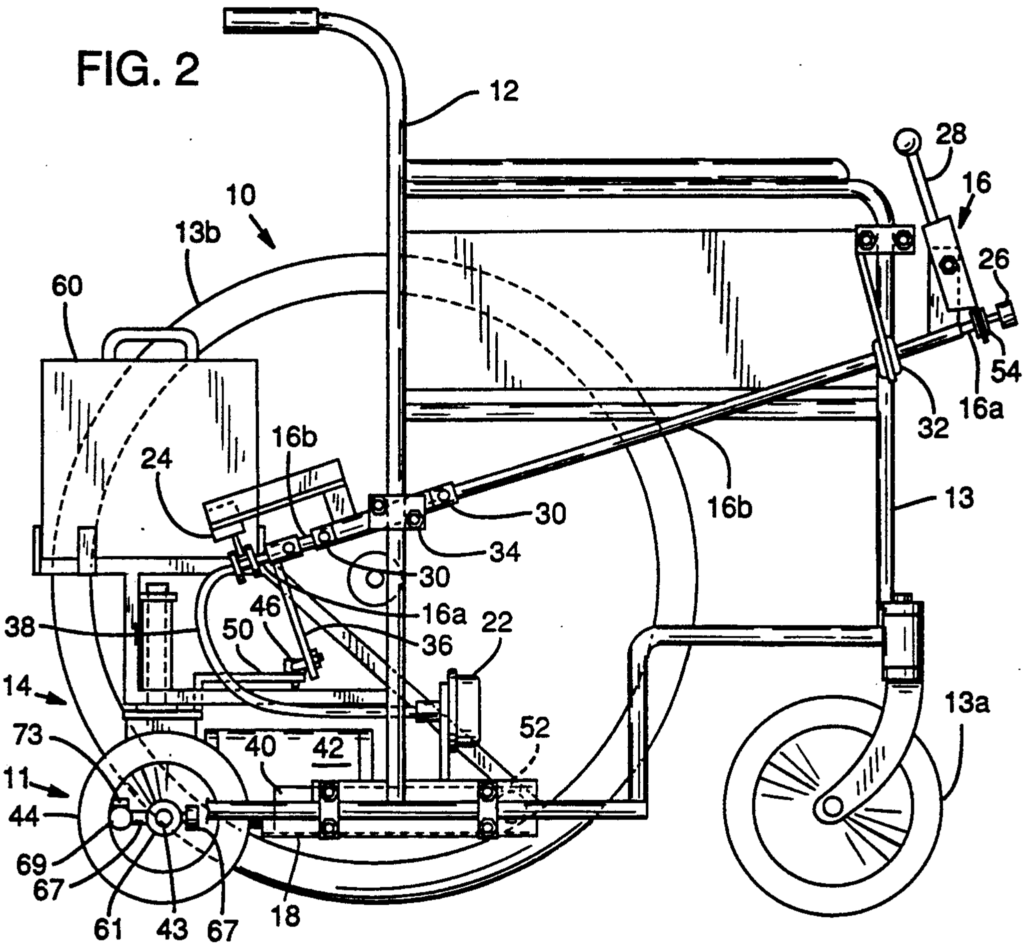
FIG. 2 is an enlarged side elevational view of the wheelchair and power unit shown in FIG. 1.
Figure 6:
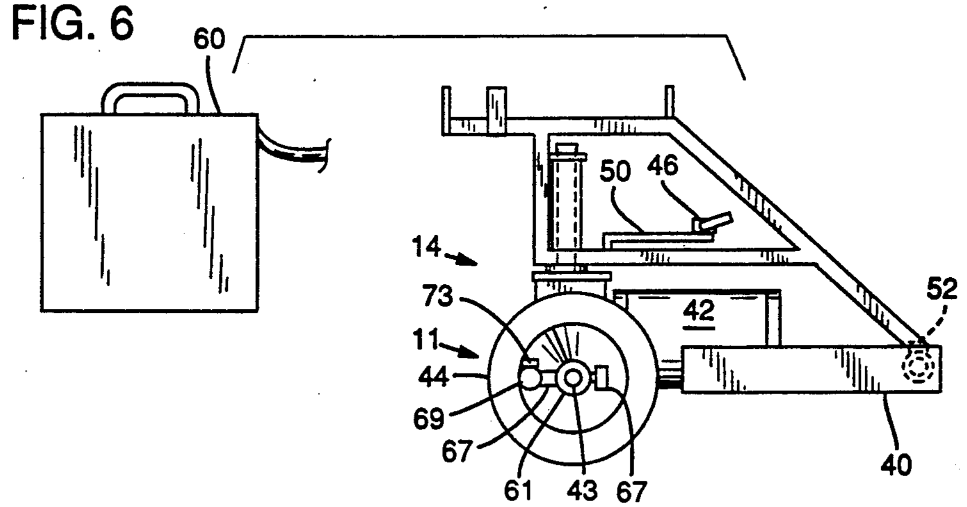
FIG. 6 is a side view of the removable transport assembly 14 and battery 60.

Referring now to FIGS. 1-6, a power driven wheelchair 10 is shown comprising a manually-operated wheelchair 12 and a power drive assembly 11 which is attachable thereto, and detachable therefrom, for driving and directing the operation of the wheelchair 12. The wheelchair 12 includes a structural frame 13, smaller swivel-type front wheels 13*a*, and large support rear wheels 13*b*.

The power drive assembly 11 consists of hand operated control assembly 16, mounting brackets 18 and 20 which remain on the chair 10 and removable transport assembly 14, and removable battery box 60.

In adapting wheelchair 12 into a power driven unit, hand operated control assembly 16 and bottom (right and left) mounting brackets 18 and 20 are first attached permanently to the wheelchair 10. Mounting brackets 32, 34 are provided for permanently mounting control assembly 16 to wheelchair 12, these items remain as part of the chair and do not restrict folding of the wheelchair 12. The removable transport assembly 14 is slid into the mounting brackets 18 and 20 from behind. Retaining bolts 58 are then tightened by hand onto UHMW pivot mounting brackets 40 supporting transport assembly 14 securely to wheelchair 12. Removable battery box 60 sits at top of removable transport assembly 14.

Regarding control assembly 16 for driving and steering the wheelchair 12, a hand-operated lever 28, in the form of a joy stick, is attached to wheelchair 12 by front control mounting bracket 32. Therefore, when the lever 28 is moved side to side, rear lever 36 is moved in an opposite direction. Lever 36 is connected to an adjustable steering linkage 46 which, in turn, is attached to a motor mounting bracket 50. Thus, moving lever 28 side to side will pivot gear motor 42 on its vertical axis and provide direct steering control for the wheelchair 12. When control lever 28 is moved in a forward or backward direction, the inner shaft 16*a* of the control assembly 16 is correspondingly moved in a forward or backward direction within tube 16*b*. This activates switch 24 to energize the gear motor 42 driving the wheelchair 12 in either a correspondingly forward or reverse mode.

When rheostat control knob 26 is rotated, the inner shaft 16*a* of the control assembly 16 is rotated within tube 16*b*. This, in turn, rotates the flexible cable 38 which controls the setting of the rheostat 22. The rheostat 22 varies the supply voltage from the battery 60 to the electrical system which includes switch 24, rheostat 22, and permanent magnet gear motor 42. This adjustment varies the speed of the permanent magnet DC motor and thus varies the ground speed of the wheelchair. Rheostat 22 is mounted on the right bracket 18 under the wheelchair and remains with the wheelchair when it is folded.

Stop collars 30 and reverse lock collar 54 are used for retention and adjustment of the control assembly 16. Drive wheel 44 is mounted with a bearing surface (not fastened) on a gear motor shaft 43, and includes aperture 45.

Figures 3, 4:
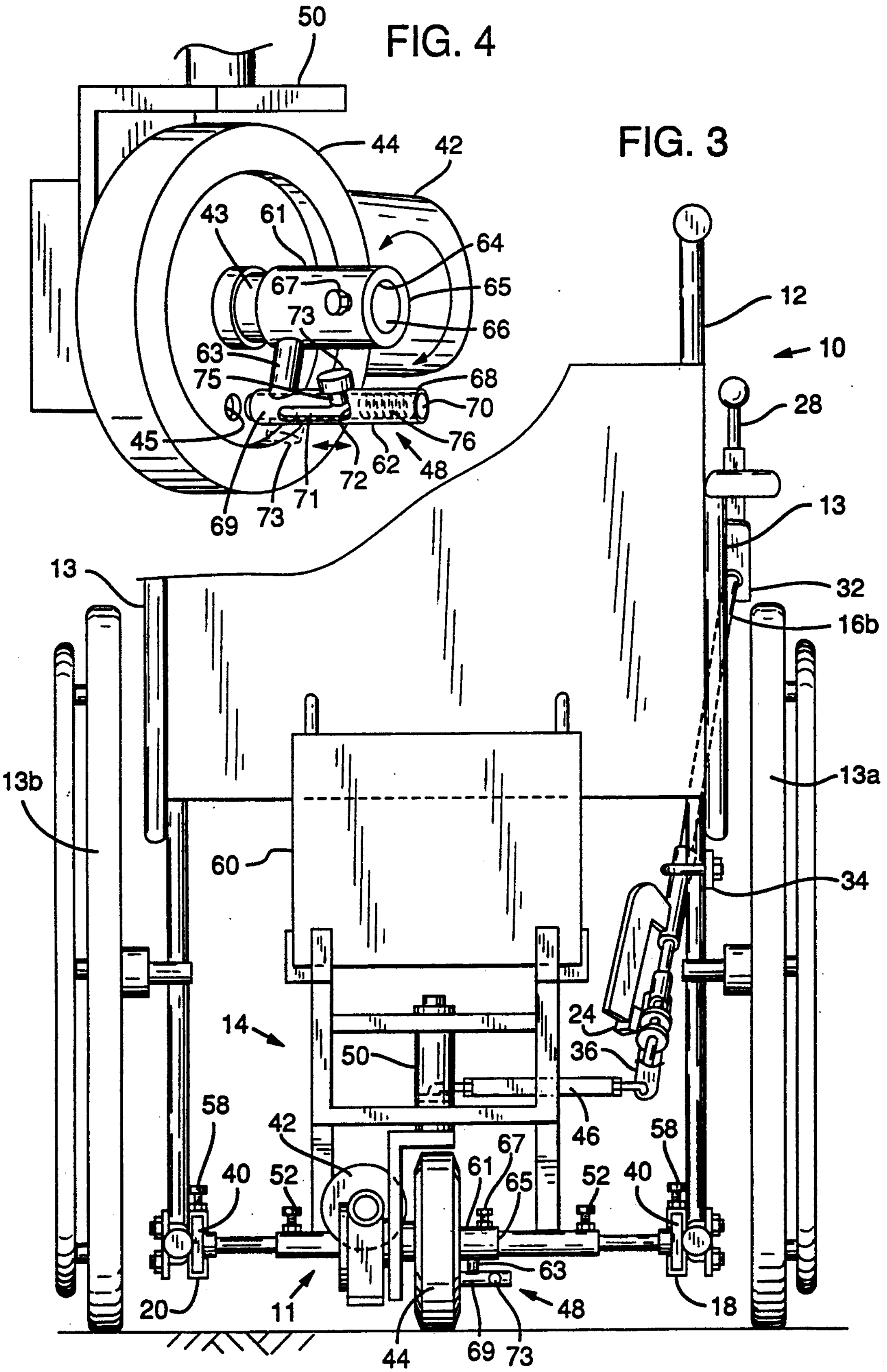
FIG. 3 is an enlarged rear elevational view of the wheelchair and power unit shown in FIG. 1.
FIG. 4 is an enlarged perspective view of clutch assembly 48 in a retracted position so that pin 71 is not located within aperture 45.

As more specifically depicted in FIG. 4, a clutch assembly 60 is engagably connected about gear motor shaft 43. Clutch assembly 48 includes a cylindrical collar 61 and a spring-loaded pin assembly 62, respectively, joined to each other by tab 63, using weldments to join tab 63 thereto. Cylindrical collar 61, which comprises outer and inner cylindrical walls, denoted 64 and 65, defines an inner cylindrical chamber 66. Bolt and jam nut assembly 67 is employed to retain shaft 43 in place within inner cylindrical chamber 66. Spring-loaded pin assembly 62 comprises an elongated sleeve member 68 which defines a cylindrical internal housing 69. The sleeve member 68 has an end wall 70 at one end and is opened at the other end. A pin 71 is disposed for sliding movement within housing 69 and extends outwardly from the opened end of the sleeve member 68. At the inner end of pin 71 is a bolt-action lever mechanism 72 including a lever arm 73. The sleeve member 68 includes an elongated slot 74 which has a notched end portion 75 located at the end of slot 74 closest to end wall 70. A spring 76 within housing 69 is biased at one end against end wall 70 and at the other end against lever mechanism 72. The lever arm 73 extends outwardly from the sleeve 68 thru slot 74 for providing the bolt-action movement of the spring-loaded pin assembly 62.

In use, the wheelchair can be controlled mechanically by the operation of drive wheel 44 in either direction. To put the wheelchair into the mechanical drive mode the lever mechanism 72 is moved within slot 74, which in turn moves spring-loaded pin assembly 62 to an extended position within the confines of aperture 45 of wheel 44 (see phantom in FIG. 4). When spring loaded pin 62 is in a retracted position, as specifically shown in FIG. 4, it is disengaged from within the confines of aperture 45 by the corresponding movement of the lever mechanism 72 to a position within notch 75. Thus, when desired, such as in case of a power failure of the wheelchair drive mechanism, pin 62 is moved from within aperture 45 by the user and the wheelchair is in a free wheeling mode.

When initially installing certain portions of the unit on wheelchair 12, brackets 18, 20, brackets 32, 34, control assembly 16 and rheostat 22 are all first installed. Width adjustment bolts 52 and corresponding steering linkage 46 are then adjusted. Finally the two retaining bolts 58, the pin on steering linkage 46, and two electrical plug connections are positioned on the wheelchair.

Once initial installation and adjustment has been completed, the unit 10 can be readily transported and used, as follows:

Wheelchair 12 is folded and put in car, along with battery 60 and removal transport assembly 14. Upon arriving at destination, the wheelchair 12 is removed and unfolded. Transport assembly 14 is slid into the brackets 18, 20 and retained by turning bolts 58. Steering linkage 46 end is pinned to rear steering lever 36. Motor 42 is plugged into wiring harness 62 (not shown). The battery 60 is set into position on top of transport assembly 14 and is plugged into wiring harness.

When use is completed, and disassembly is desired, the above process is merely reversed. The battery 60 is disconnected from the wiring harness and put in car. The motor is then disconnected from the wiring harness, the steering linkage 46 is unpinned, bolts 58 are loosened, and the transport assembly is put in the rear of the car. The wheelchair is then folded and also put into the car.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. An apparatus for driving and steering a manually-driven wheelchair having a frame an a plurality of wheels which ride on an underlying driving surface, which comprises a pivoting drive and steering wheel which rides on the underlying driving surface for driving and steering said wheelchair;

a drive motor assembly for powering said drive and steering wheel, said drive motor assembly being controllable by the user for driving said wheelchair forward and backward;

said drive motor assembly comprising a single drive motor, a driving hub drivably connected to said drive motor and to said driving and steering wheel, and motor controlling means for controlling said drive motor, said motor controlling means being controllably connected to a drive motor assembly controlling means;

said driving hub having a first setting in which said drive motor is drivably connected to said drive and steering wheel, and a second setting for disengaging said drive and steering wheel from said drive motor, thereby allowing the wheelchair to be operated manually without detaching said wheelchair driving and steering apparatus from said wheelchair;

means for pivoting said drive and steering wheel, said drive motor assembly controlling means and said pivoting means together comprising a control lever assembly and a rheostat;

said control lever assembly including a single control lever movable in a forward and backward direction for electrically controlling said drive motor assembly to drive the wheelchair in a forward and backward direction, said control lever assembly being movable in a left and right direction for mechanically pivoting said drive and steering wheel to steer the wheelchair in a left and right direction;

said rheostat being electrically connected to said drive motor assembly for controlling the speed of said wheelchair;

said rheostat having a plurality of settings for selecting one of a plurality of constant driving speeds, thereby providing a choice of safe driving speeds for users with impaired motor skills;

said wheelchair driving and steering apparatus being attachable to, and detachable from said wheelchair; and said wheelchair driving and steering apparatus being pivotally attachable to said wheelchair frame so that the weight on the drive and steering wheel means will substantially only be the weight of said apparatus, and so that the weight of a person sitting in said wheelchair will be substantially the only weight imparted to said wheelchair wheels, whereby the powered steering and driving operations are continuously conducted with the respective wheelchair wheels and the drive wheels remaining on the ground and without regard to the weight of the person sitting in the wheelchair.

2. The wheelchair driving and steering apparatus of claim 1, wherein said means for controlling said drive motor assembly and said means for pivoting said drive and steering wheel are operable by a user seated in said wheelchair.

3. The apparatus of claim 2 in which said means for pivoting said drive and steering wheel further comprises a steering linkage system connected to said control lever and to said driving and steering wheel so that said driving and steering wheel is pivoted to an angle directly corresponding to the angle of said control lever, thereby steering the wheelchair in a direction which directly corresponds to the movement of said control lever.

4. The apparatus of claim 2, wherein said means for controlling the direction of rotation of said drive and steering wheel comprises a lever which is movable to respective forward, stop, and reverse positions, the area traversed by said lever in said stop position being substantially greater than the respective areas for said forward and reverse positions, so that a driver with poor muscle control will not experience difficulty of maneuverability by accidentally engaging the incorrect directional position when attempting to stop.

5. A power driven and manually-driven wheelchair having a plurality of wheels riding on an underlying surface, which comprises a manually-driven wheelchair;

an apparatus for driving and steering and said wheelchair including a pivoting drive and steering wheel which rides on the underlying surface for driving and for steering said wheelchair;

a drive motor assembly for powering said drive and steering wheel, said drive motor assembly being controllable for driving said wheelchair forward and backward;

means for controlling said drive motor assembly to drive said wheelchair and means for pivoting said drive and steering wheel to steer said wheelchair, said controlling means and pivoting means comprising a control lever assembly and a rheostat;

said control lever assembly including a single control lever which is movable forward and backward for electrically controlling said drive motor assembly to drive the wheelchair forward and backward respectively, said control lever being movable left and right for mechanically pivoting said drive and steering wheel to steer the wheelchair left and right respectively;

said rheostat being electrically connected to said drive motor assembly for controlling said drive motor assembly to control the speed of said wheelchair;

said rheostat having a plurality of positions for selecting form a plurality of constant driving speeds, thereby providing a plurality of safe driving speeds for users with impaired motor skills and/or limited hand movement and coordination;

said wheelchair driving and steering apparatus being attachable to, and detachable from said wheelchair;

said wheelchair driving and steering apparatus being pivotally attachable to said wheelchair so that the weight on the drive and steering wheel will substantially only be the weight of said apparatus, and the weight of a person sitting in said wheelchair will be substantially the only weight imparted to said wheelchair wheels, so that the powered steering and driving operations are continuously conducted with the wheelchair wheels and the drive wheels, respectively, on the ground and without regard to the weight of the person sitting in the wheelchair; and said means for controlling said drive motor assembly and means for pivoting said drive and steering wheel being operable by a user seated in said wheelchair, and said means for pivoting said drive and steering wheel comprises a steering linkage system connected to said control lever and to said drive and steering wheel so that said drive and steering wheel is pivoted to an angle directly corresponding to the movement of the control lever to the left and right, thereby steering the wheelchair in a direction which directly corresponds to the movement of said control lever.

6. The wheelchair of claim 5, wherein said means for controlling the direction of rotation of said drive and steering wheel means comprises a control lever which is movable to respective forward, stop, and reverse positions, the area traversed by said lever in said stop position being substantially greater than the respective areas for said forward and reverse positions, so that a driver with poor muscle control will not experience difficulty of maneuverability by accidentally engaging the incorrect directional position when attempting to stop.

7. A power driven and manually driven wheelchair having a plurality of wheels riding on an underlying surface, which comprises an apparatus for driving and steering said wheelchair including a drive and steering wheel which rides on the underlying surface for driving and for steering said wheelchair and a controllable motor assembly for powering said drive and steering wheel comprising a single drive wheel;

a drive hub drivingly connected to said drive motor and to said drive and steering wheel; and motor controlling means for controlling said drive motor, said motor controlling means being controllably connected to said drive motor assembly controlling means;

means for pivoting said drive and steering wheel comprising a steering linkage system including a control lever;

said steering linkage being connected to said drive and steering wheel so that said drive and steering wheel is pivoted to an angle directly corresponding to the movement of said control lever to the left and right, thereby steering the wheelchair in a direction which directly corresponds to the movement of said control lever;

said apparatus being attachable to, and detachable from said wheelchair and being pivotally attachable to said wheelchair so that the weight on the drive and steering wheel means will substantially only be the weight of said apparatus, and the weight of a person sitting in said wheelchair will be substantially the only weight imparted to said wheelchair wheels, so that the powered steering and driving operation are continuously conducted with the wheelchair wheels and the drive end steering wheel respectively, on the ground and without regard to the weight of the person sitting in the wheelchair; and wherein said driving hub has a first setting in which said drive motor is drivably connected to said drive and steering wheel, and a second setting for disengaging said drive and steering wheel from said drive motor, thereby allowing the wheelchair to be operated manually without detaching said wheelchair driving and steering apparatus from said wheelchair.

8. A power driven and manually-driven wheelchair having a plurality of wheels riding on an underlying surface, which comprises an apparatus for driving and steering said wheelchair including a pivoting drive and steerign wheel which rides on the underlying surface for driving and for steering said wheelchair;

a drive motor assembly for powering said drive and steering wheel, said drive motor assembly being controllable for driving said wheelchair forward and backward;

means for controlling said drive motor assembly to drive said wheelchair and means for pivoting said drive and steering wheel to steer said wheelchair, said controlling means and pivoting means comprising a control lever assembly and a rheostat;

said control lever assembly including a single control lever which is movable forward and backward for electrically controlling said drive motor assembly to drive the wheelchair forward and backward respectively, said control lever being movable left and right for mechanically pivoting said drive and steering wheel to steer the wheelchair let and right respectively;

said rheostat being electrically connected to said drive motor assembly for controlling said drive motor assembly to control the speed of said wheelchair;

said rheostat having a plurality of positions for selecting from a plurality of constant driving speeds, thereby providing a plurality of safe driving speeds for users with impaired motor skills;

said wheelchair driving and steering apparatus being attachable to, and detachable from said wheelchair;

said wheelchair driving and steering apparatus being pivotally attachable to said wheelchair so that the weight on the drive and steering wheel will substantially only be the weight of said apparatus, and the weight of a person sitting in said wheelchair will be substantially the only weight imparted to said wheelchair wheels, so that the powered steering and driving operations are continuously conducted with the wheelchair wheels and the drive and steering wheel respectively, on the ground and without regard to the weight of the person sitting in the wheelchair;

wherein said drive motor assembly comprises single drive motor; a driving hub drivably connected to said drive motor and to said drive and steering wheel; said motor controlling means for controlling said drive motor, said motor controlling means being controllably connected to said drive motor assembly controlling means; and wherein said driving hub has a first configuration in which said drive motor is drivably connected to said drive and steering wheel, and a second configuration for disengaging said drive and steering wheel from said drive motor, thereby allowing the wheelchair to be operated manually without detaching said wheelchair driving and steering apparatus.

9. A wheelchair assembly having a plurality of wheels riding on an underling surface, which comprises manually-driven wheelchair;

an apparatus for driving and steering said wheelchair including a drive and steering wheel which rides on the underlying surface for driving and for steering said wheelchair and a controllable motor assembly for powering said drive and steering wheel;

means for pivoting said drive and steering wheel comprising a steering linkage system including a control lever;

said steering linkage being connected to said drive and steering wheel so that said drive and steering wheel is pivoted to an angle directly corresponding to the movement of said control lever to the left and right, thereby steering the wheelchair in a direction which directly corresponds to the movement of said control lever;

said apparatus being attachable to, and detachable from said wheelchair and being pivotally attachable to said wheelchair so that the weight on the drive and steering wheel means will substantially be the weight of said apparatus, and the weight of a person sitting in said wheelchair will be substantially the only weight imparted to said wheelchair wheels, so that the powered steering and driving operations are continuously conducted with the wheelchair wheels and the drive and steering wheel, respectively, on the ground and without regard to the weight of the person sitting in the wheelchair; and wherein said means for controlling the direction of rotation said drive and steering wheel comprises a level which is movable to respective forward, stop, and reverse positions, the area traversed by said lever in said stop position being substantially greater than the respective areas for said forward and reverse positions, so that a driver with poor muscle control will not experience difficulty of maneuverability by accidentally engaging the incorrect directional position when attempting to stop.

* * * * *

UNITED STATES PATENT AND TRADEMARK OFFICE

CERTIFICATE OF CORRECTION

PATENT NO. : 5,135,063
DATED : August 4, 1992
INVENTOR(S) : Walter K. Kropf

It is certified that error appears in the above-indentified patent and that said Letters Patent is hereby corrected as shown below:

| | |
|---|---|
| Column 6 | Line 22, change "60" to --48--; |
| Column 7 | Line 30, change "an" to --and--; |
| Column 8 | Line 51, delete second "and"; |
| Column 9 | Line 10, change "form" to --from--; |
| Column 10 | Line 34, change "steerign" to --steering--; |
| Column 10 | Line 52, change "let" to --left--; |
| Column 11 | Line 8, after "comprises" insert --a--; |
| Column 11 | Line 11, change "said" to --and--; |

UNITED STATES PATENT AND TRADEMARK OFFICE

CERTIFICATE OF CORRECTION

PATENT NO. : 5,135,063
DATED : August 4, 1992
INVENTOR(S) : Walter K. Kropf

It is certified that error appears in the above-indentified patent and that said Letters Patent is hereby corrected as shown below:

Column 11 Line 25, before "manually-driven" insert --a--;

Column 12 Line 14, after "substantially" insert --only--;

Column 12 Line 26, change "level" to --lever--.

Signed and Sealed this

Twenty-eighth Day of June, 1994

Attest:

Bruce Lehman

BRUCE LEHMAN

*Attesting Officer* *Commissioner of Patents and Trademarks*